US011507307B2

(12) United States Patent
Shimada et al.

(10) Patent No.: US 11,507,307 B2
(45) Date of Patent: Nov. 22, 2022

(54) STORAGE SYSTEM INCLUDING A MEMORY CONTROLLER THAT ENABLES EACH STORAGE CONTROLLER OF A PLURALITY OF STORAGE CONTROLLERS TO EXCLUSIVELY READ AND WRITE CONTROL INFORMATION OF THE MEMORY

(71) Applicant: Hitachi, Ltd., Tokyo (JP)

(72) Inventors: Kentaro Shimada, Tokyo (JP); Akira Yamamoto, Tokyo (JP); Katsuya Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 200 days.

(21) Appl. No.: 16/801,334

(22) Filed: Feb. 26, 2020

(65) Prior Publication Data
US 2020/0401346 A1 Dec. 24, 2020

(30) Foreign Application Priority Data

Jun. 20, 2019 (JP) .............................. JP2019-114290

(51) Int. Cl.
*G06F 3/06* (2006.01)
(52) U.S. Cl.
CPC .......... *G06F 3/0659* (2013.01); *G06F 3/0604* (2013.01); *G06F 3/0688* (2013.01)
(58) Field of Classification Search
CPC .... G06F 3/0659; G06F 3/0688; G06F 3/0604; G06F 3/065; G06F 3/0658; G06F 3/067
See application file for complete search history.

(56) References Cited

U.S. PATENT DOCUMENTS

| 2004/0123068 | A1  | 6/2004  | Hashimoto |
|---|---|---|---|
| 2004/0158764 | A1  | 8/2004  | Sonoda et al. |
| 2004/0243687 | A1* | 12/2004 | Sakaguchi .......... G06F 12/0871 709/213 |
| 2012/0239853 | A1* | 9/2012  | Moshayedi ........... G06F 3/0613 711/103 |
| 2015/0242124 | A1* | 8/2015  | Law .................... G06F 11/2056 711/103 |
| 2017/0185343 | A1* | 6/2017  | Ray ........................ G06F 3/0644 |
| 2018/0196748 | A1* | 7/2018  | Ambrosi ............. G06F 12/0246 |

FOREIGN PATENT DOCUMENTS

| JP | 2004-199420 A | 7/2004 |
|---|---|---|
| JP | 2004-213435 A | 7/2004 |
| JP | 2004-355307 A | 12/2004 |

* cited by examiner

*Primary Examiner* — Jyoti Mehta
(74) *Attorney, Agent, or Firm* — Mattingly & Malur, PC

(57) ABSTRACT

A storage system includes a plurality of storage controllers and a drive box including one or more non-volatile storage devices. The drive box includes a memory on which reading and writing are performed in a unit different from a unit for reading and writing the one or more non-volatile storage devices, and which stores control information to be used by the plurality of storage controllers, and a memory controller that enables each storage controller of the plurality of storage controllers to exclusively read and write the control information of the memory by arbitrating accesses to the memory from the plurality of storage controllers.

12 Claims, 12 Drawing Sheets

STORAGE SYSTEM INCLUDING A MEMORY CONTROLLER THAT ENABLES EACH STORAGE CONTROLLER OF A PLURALITY OF STORAGE CONTROLLERS TO EXCLUSIVELY READ AND WRITE CONTROL INFORMATION OF THE MEMORY

CLAIM OF PRIORITY

The present application claims priority from Japanese patent application JP2019-114290 filed on Jun. 20, 2019, the content of which is hereby incorporated by reference into this application.

BACKGROUND OF THE INVENTION

1. Field of the Invention

The present disclosure relates to a storage system, and more particularly, to a technology for sharing a drive box between a plurality of storage controllers.

2. Description of the Related Art

In a storage system, in order to improve reliability, a plurality of storage controllers for controlling the system is provided, and an operation can be continued with the remaining storage controllers even though a failure occurs in any one of the storage controllers. A typical number of storage controllers is two.

In the storage system, performance is also important. Therefore, when the plurality of storage controllers is provided, some of the plurality of storage controllers cooperatively perform processing. In order to perform such cooperative processing, relevant control information is shared between the storage controllers, and when the control information is updated by one storage controller, the updated information needs to be immediately transmitted to other storage controllers. Alternatively, when two or more storage controllers separately update the same control information, it is necessary to arbitrate between the storage controllers such that the control information can be correctly updated.

In general, some network, for example, Ethernet, may be provided between the storage controllers as means for sharing the control information between the storage controllers. However, such a network is designed to be convenient for connecting independent systems each other. When there is an attempt to connect a plurality of controllers within a single system by such a network, a bandwidth is insufficient, or a delay time becomes longer. Accordingly, it may be difficult to use the network.

Meanwhile, in order to achieve required performance by arbitrarily assigning the storage controllers that perform control to a plurality of storage devices within the storage system, all the storage devices may be shared between the storage controllers. These storage devices are, for example, hard disk drives that perform magnetic recording. Another example of the storage device is a solid state drive (SSD) using a flash memory which is a non-volatile semiconductor element. The storage device may include a disk cache using a volatile semiconductor storage element such as a dynamic random access memory (DRAM) in order to realize higher-speed access.

The disk cache is shared between all the storage controllers sharing the storage device. Therefore, it is considerable that this disk cache is used for sharing the control information between the storage controllers. JP 2004-355307 A discloses this example. The control information has a different access unit and a different access protocol from those of normal data (user data) stored in the storage device or the disk cache. JP 2004-355307 A discloses that the control information is stored in a part of the disk cache and a unit appropriate for the control information access and a function of reading and writing in an access protocol are provided. However, J P 2004-355307 A does not disclose a technology for arbitrating processing between the storage controllers for updating the control information. Thus, it is difficult for the plurality of storage controllers to perform cooperative processing by simultaneously updating the control information.

As another method of sharing the control information between the plurality of storage controllers, it is considerable that it is not necessary to arbitrate update operation of the control information between the storage controllers by changing a form of the control information to be shared. As the form of the control information, there is a form in which the update of the control information in all the storage controllers is accumulated as history information (log information).

In this case, since each storage controller cannot refer to the update of the control information of the other storage controller until all the operations are completed and all the updates are reflected, it is difficult to perform the cooperative processing by simultaneously referring and updating the control information in the plurality of storage controllers. JP 2004-199420 A and JP 2004-213435 A disclose this example. In JP 2004-199420 A and JP 2004-213435 A, when a certain storage controller fails and stops an operation between the storage controllers, another storage controller performs only failover processing for taking over the operation afterwards.

SUMMARY OF THE INVENTION

When the performance is improved by providing the plurality of storage controllers and performing the cooperative processing, it is necessary to efficiently perform sharing and updating of the control information between the storage controllers and the arbitration for update operations the control information.

It is possible to speed up sharing of the control information between the storage controllers by providing the disk cache within the drive box shared between the storage controllers and storing the control information in a part of the disk cache. However, the arbitration for updating operations of the control information stored in the part of the disk cache between the plurality of storage controllers cannot be done by only providing the part of the disk cache. For example, it is necessary to limit the operation of the storage controller such as a case where the failover processing is performed when one storage controller fails. As a result, it is difficult to improve the performance by operating the plurality of storage controllers without any limits.

Therefore, there is a need for a technology capable of realizing sharing and updating of the control information between the storage controllers, and arbitration for updating operations and efficient and high-speed access to the control information.

An aspect of the present invention provides a storage system including a plurality of storage controllers, and a drive box that includes one or more non-volatile storage devices. The drive box includes a memory on which reading and writing are performed in a unit different from the unit of the one or more non-volatile storage devices, and which stores control information to be used by the plurality of storage controllers, and a memory controller that enables each storage controller of the plurality of storage controllers to exclusively read and write the control information of the memory by arbitrating access to the memory from each of the plurality of storage controllers.

According to an embodiment of the present disclosure, it is possible to realize sharing and updating of control information between storage controllers, arbitration for the updating, and efficient and high-speed access to the control information.

DESCRIPTION OF THE PREFERRED EMBODIMENTS

Hereinafter, embodiments of the present invention will be described with reference to the accompanying drawings. It should be noted that the present embodiment is only an example for realizing the present invention, and does not limit the technical scope of the present invention.

First Embodiment

Figure 1:
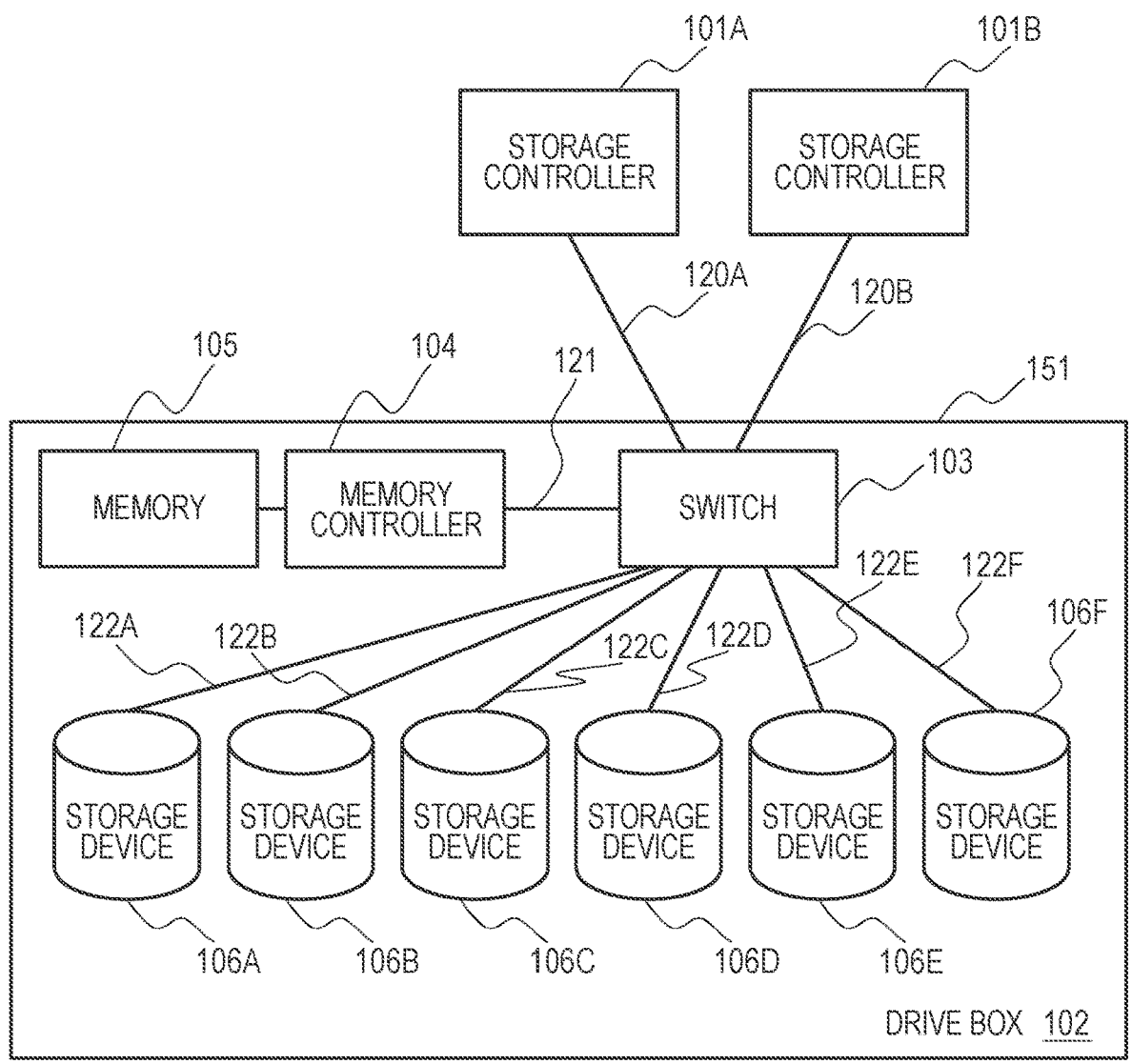
FIG. 1 is an example of a configuration of a storage system according to an embodiment.
Figure 2:
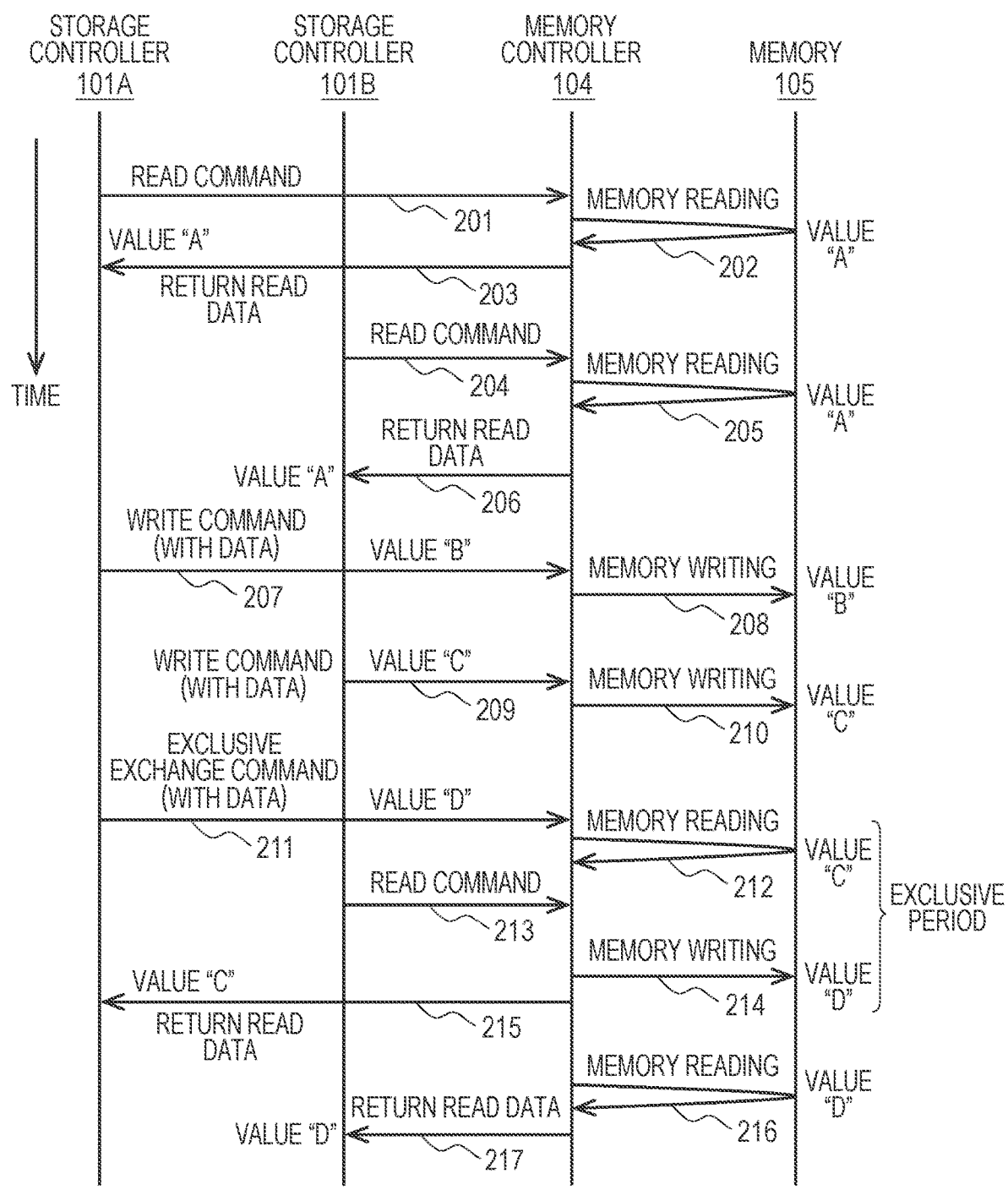
FIG. 2 is an example of an operation in which two storage controllers read and write a memory within a drive box within the storage system according to the embodiment.

A first embodiment will be described with reference to FIGS. 1 and 2. FIG. 1 illustrates a configuration example of a storage system according to the first embodiment. In FIG. 1, the storage system includes two storage controllers 101A and 101B and one drive box 102. The drive box 102 includes a switch 103, a memory controller 104, a memory 105, storage devices 106A to 106F, and a chassis 151 that houses these components.

The storage controllers 101A and 101B cooperatively control the entire storage system, and perform input and output (I/O) and various controls of data according to a request from a host machine (not illustrated). Although FIG. 1 illustrates two storage controllers 101A and 101B, the number of storage controllers may be more than two. The switch 103 connects the storage controllers 101A and 101B, the memory controller 104, and the storage devices 106A to 106F to each other, and switches the transfer of data, control information, and access commands between these components.

The memory controller 104 mediates communication between the storage controllers 101A and 101B and the memory 105. According to requests of the storage controllers 101A and 101B, reading, writing, and exclusively accessing of control information and other data necessary for processing of the storage controllers (processing data except user data from a host) are performed for the memory 105.

The memory 105 is controlled by the memory controller 104, and stores control information and processing data. The control information is information used for controlling the storage system, and includes, for example, volume configuration, address mapping, access status to a volume, and a configuration and an operation status of each storage controller. The memory 105 may be a device including a volatile memory element in order to realize high-speed access. An example of the volatile memory device is a dynamic random access memory (DRAM). The memory 105 may be a device including a non-volatile memory element. Accordingly, a possibility of information loss can be reduced. The memory 105 can also be used as a cache for temporarily storing user data from the host.

Although FIG. 1 illustrates one memory controller 104 and one memory 105 as an example, the number of these components may be any number of one or more. For example, two memory controllers and four memories may be connected to the switch 103, and each memory controller may control two memories.

The storage devices 106A to 106F are non-volatile storage devices that ultimately store data within the storage system. The non-volatile storage device is, for example, a hard disk drive using magnetic recording or a solid state drive (SSD) using a non-volatile semiconductor memory element (NAND flash memory). The reading and writing of data from and to the storage devices 106A to 106F which are any types of non-volatile devices are controlled by the storage controllers 101A and 101B. Although FIG. 1 illustrates six storage devices 106A to 106F as an example, the number of storage devices is not limited to six but one or more.

The storage devices 106A to 106F are accessed by an access protocol and an access unit appropriate for the transfer of data stored in the storage devices. The access protocol is, for example, Serial Attached SCSI (SAS), Serial ATA (SATA), Fibre Channel (FC), or Non-Volatile Memory Express (NVMe). The access unit is, for example, a 512-byte block. The access protocol used for the storage devices 106A to 106F is particularly used on paths 122A to 122F between the switch 103 and the storage devices 106A to 106F.

The memory 105 is accessed in a unit different from the access unit of the storage devices 106A to 106F in order to efficiently access the stored control information. The access unit is smaller than the access unit of the storage device, and is, for example, one word of 8 bytes. The access protocol is also different from the access protocol of the storage device. A command to the memory 105 includes, for example, a read command and a write command. The storage controllers 101A and 101B issue these commands, and the memory controller 104 receives these commands. The memory controller 104 reads and writes data from and to the memory 105 according to the received command.

Therefore, an access protocol appropriate to transmit such a command or information (data) handled by the command is particularly used on a path 121 between the switch 103 and the memory controller 104. An example of such an access protocol is Peripheral Component Interconnect Express (PCIe).

In such an access protocol, the read command for reading information (data) from the memory 105 accompanies address information indicating a location (address) within the memory 105, and the information (read data) stored at the address is read, and is returned to the storage controller 101A or 101B that sends the command. The write command accompanies address information indicating a location within the memory 105 and information (write data) to be written to the address, and the write data is stored at the address.

The access protocol includes an exclusive access command as still another command. An example of the exclusive access command is an exclusive exchange command. The exclusive exchange command accompanies address information indicating a location (address) within the memory 105 and information (write data) to be written to the address. According to the exclusive exchange command, the information (data) stored at the address is read, and is returned to the storage controller 101A or 101B that sends the command. And, inseparably, the information stored at the address is replaced with the write data attached to the command.

According to the exclusive exchange command, the memory controller 104 ensures that the contents at the address within the memory 105 are not read and written from another storage controller other than the storage controller that sends the command from the time when the information stored at the address is read to the time when the information at the address is replaced with the write data attached to the command. This ensuring function is a function of the memory controller 104, and realizes information consistency.

The access protocol may include another exclusive access command. An example of another exclusive access command is a fetch and add command. According to the fetch and add command, the contents at the address are read, a value designated by the command is added, and the contents are written back. During this operation, it is guaranteed that the memory contents at the address are not read and written by other storage controllers. The access protocol may include an exclusive read command. The exclusive read command accompanies the designated address, and it is guaranteed that the memory contents at the address are not read and written during the access.

The paths 120A and 120B between the storage controllers 101A and 101B and the switch 103 need to transfer data according to two types of access protocols. One is an access protocol for accessing the memory 105 from the storage controller 101A or 101B. The other is an access protocol for accessing the storage devices 106A to 106F used on the paths 122A to 122F. Thus, the access protocol used in each of the path 121 and the paths 122A to 122F is limited to a combination that can be simultaneously used on the paths 120A and 102B.

An example of such a combination of the access protocols is a combination of the PCIe and the NVMe. The PCIe is used to access the memory 105 through the memory controller 104. The NVMe is used to access the storage devices 106A to 106F. The NVMe is defined as an access protocol for reading and writing block data over the PCIe. The NVMe and the PCIe can be simultaneously used on the same path 120A or 120B.

Next, specific reading and writing of the memory 105 and execution of the exclusive exchange command will be described with reference to FIG. 2. FIG. 2 illustrates an example of a flow of processes of reading and writing data from and to the memory 105. In FIG. 2, for example, the storage controller 101A sends the read command to the memory controller 104 in process 201. The memory controller 104 reads the information from the memory 105 in process 202, and returns the information to the storage controller 101A in process 203. A value of the information at this time is, for example, "A".

Subsequently, when the storage controller 101B similarly sends the read command to the memory controller 104 in process 204, the memory controller 104 reads the information (value "A") from the memory 105 in process 205, and proceeds to process 206 to return the read information to the storage controller 101B.

Subsequently, for example, the storage controller 101A sends the write command having a value "B" as the write data to the memory controller 104 in process 207. The memory controller 104 stores the write data (value "B") in the memory 105 in process 208 according to the write command sent in process 207.

Similarly, for example, the storage controller 101B sends the write command having a value "C" as the write data to the memory controller 104 in process 209. The memory controller 104 stores the write data (value "C") in the memory 105 in process 210 according to the sent write command.

Next, an example of the exclusive exchange command will be described. The exclusive exchange command having a value "D" as the write data is sent from the storage controller 101A to the memory controller 104 in process 211. When the exclusive exchange command is received, the memory controller 104 first extracts the current value "C" from the memory 105 in process 212.

Subsequently, in process 214, the memory controller 104 writes the write data (value "D") attached to the exclusive exchange command to the memory 105. Thereafter, in process 215, the memory controller 104 returns the value "C" previously read from the memory 105 to the storage controller 101A.

The access to the memory 105 is an exclusive period from when the exclusive exchange command is received in the process 211 to when the value read in the process 215 is returned to the storage controller 101A. In the example of FIG. 2, after process 211 and before process 215, the storage controller 101B sends the read command to the memory controller 104 in process 213. The read command is waited for in the memory controller 104 until process 215 is completed.

When process 215 is completed, the waiting of the read command sent in process 213 is released. The memory controller 104 reads the information (value "D") from the memory 105 in process 216, and returns the read information to the storage controller 101B in process 217.

Through the aforementioned processes, updating of the control information between the plurality of storage controllers and arbitration for the updating can be efficiently performed via the drive box shared between all the storage controllers. The plurality of storage controllers can simultaneously update the control information, and can perform cooperative processing. Accordingly, it is possible to simultaneously realize the updating of the control information and the arbitration for the updating, and the high-speed access of the control information.

That is, the storage controllers 101A and 101B can control the storage system by reading and writing the control information from and to the memory 105. The storage controllers 101A and 101B can update the control information and arbitrate the update by using, for example, the exclusive exchange command. As a result, the storage controllers 101A and 101B can cooperatively control the operation of the entire storage system.

Since the control information is stored within the drive box, the operating storage controller can be flexibly changed. Since the drive box performs the arbitration for the updating of the control information, it is not necessary to implement the arbitration function in the storage controller.

Second Embodiment

Figure 11:
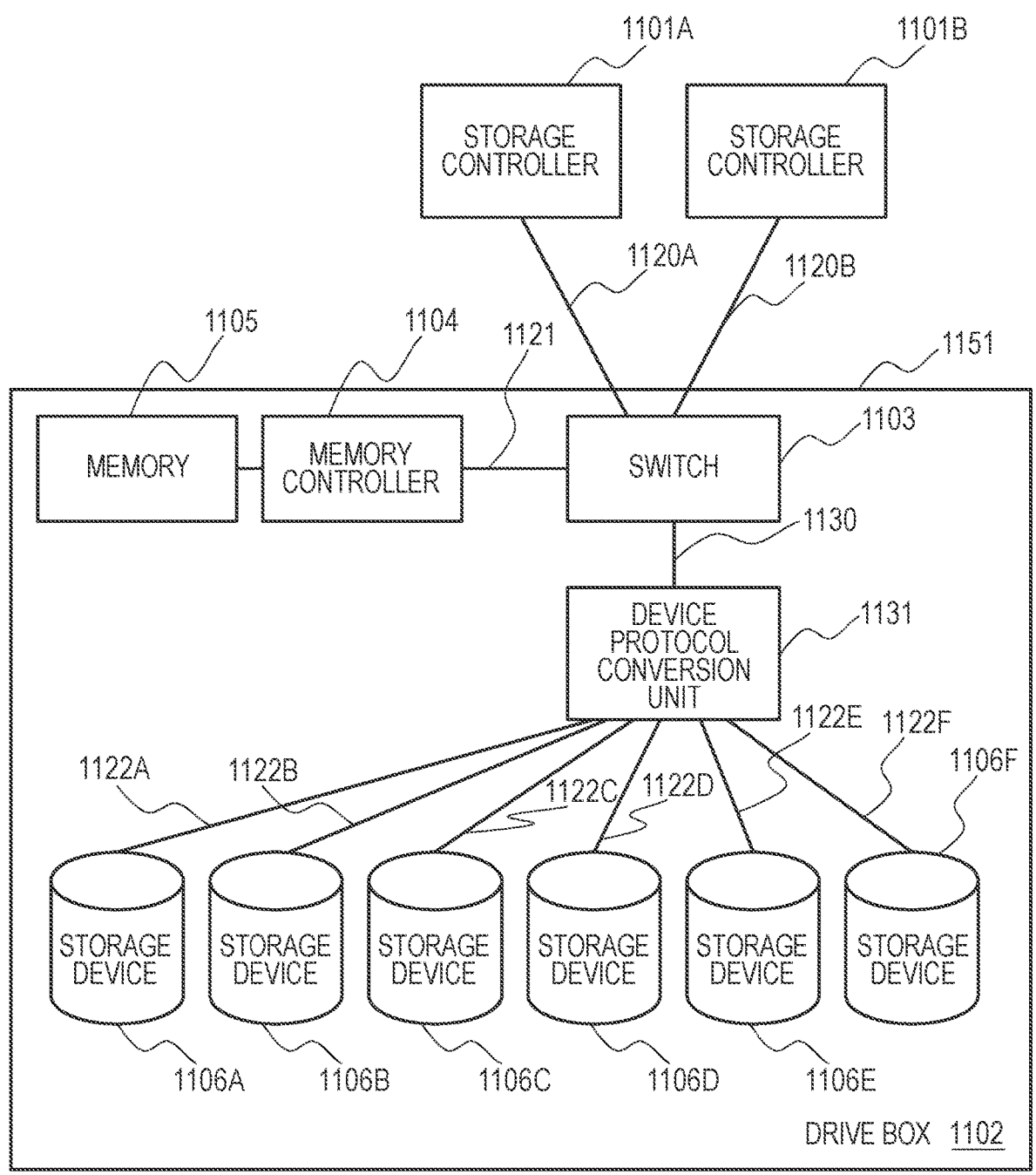
FIG. 11 is a sixth example of the configuration of the storage system according to the embodiment.

A second embodiment will be described with reference to FIG. 11. FIG. 11 illustrates a configuration example of a storage system according to the second embodiment. The configuration example of FIG. 11 includes a device protocol conversion unit 1131 between a switch 1103 and storage devices 1106A to 1106F.

The storage system according to the second embodiment includes storage controllers 1101A and 1101B and a drive box 1102. A drive box 1102 includes the switch 1103, a memory controller 1104, a memory 1105, a device protocol conversion unit 1131, the storage devices 1106A to 1106F, and a chassis 1151.

Although FIG. 11 illustrates two storage controllers 1101A and 1101B, the number of storage controllers may be more than two. Although FIG. 11 illustrates one memory controller 1104 and one memory 1105 as an example, the number of these components may be any number of one or more. Although FIG. 11 illustrates six storage devices 1106A to 1106F as an example, the number of storage devices may be any number of one or more.

In the configuration example of FIG. 11, two access protocols are used within the drive box 1102. One is an access protocol for accessing the memory 1105 from the storage controller 1101A or 1101B via a path 1121. The other is an access protocol for accessing the storage devices 1106A to 1106F used on paths 1122A to 1122F.

In the second embodiment, the access protocol used on the paths 1120A and 1120B between the storage controllers 1101A and 1101B and the switch 1103 matches the access protocol of the smaller access unit. The second embodiment copes with the access protocol of the larger access unit by performing protocol conversion from the access protocol of the smaller access unit.

The access unit for accessing the memory 1105 via the path 1121 is, for example, one word of 8 bytes, and the access unit for accessing the storage devices 1106A to 1106F via the paths 1122A to 1122F is, for example, one block of 512 bytes. Since the access unit for the memory 1105 is smaller in this embodiment, the access protocol used on the paths 1120A and 1120B matches the access protocol used on the path 1121 in the second embodiment. In the second embodiment, the protocol conversion is performed such that data transfer through the paths 1122A to 1122F complies with the access protocol of a predetermined access unit. The protocol conversion may be performed within the switch 1103 or at an output port of the switch 1103, or an independent protocol conversion unit (circuit device) may be implemented.

The configuration example illustrated in FIG. 11 includes the device protocol conversion unit 1131 as an independent protocol conversion unit. For example, the device protocol conversion unit 1131 selects the PCIe for accessing the memory 1105, and selects the SAS as an access protocol for the storage devices 1106A to 1106F. In this case, the PCIe is used on paths 1120A and 1120B from the storage controllers 1101A and 1101B, the path 1121 from the switch 1103 to the memory controller 1104, and a path 1130 from the switch 1103 to the device protocol conversion unit 1131.

The SAS is used on the paths 1122A to 1122F from the device protocol conversion unit 1131 to the storage devices 1106A to 1106F. The device protocol conversion unit 1131 converts the access to the storage devices 1106A to 1106F expressed by using the PCIe which is sent from the storage controllers 1101A and 1101B to the access using the SAS, and accesses the storage devices 1106A to 1106F.

The result of accessing the storage devices 1106A to 1106F is returned to the device protocol conversion unit 1131 via the paths 1122A to 1122F according to the specification defined by the SAS. The device protocol conversion unit 1131 converts the returned access result using the SAS into the expression using the PCIe, and returns the result to the storage controller 1101A or 1101B via the path 1130, the switch 1103, and the path 1120A or 1120B. Other operations are the same as the operations described with reference to FIGS. 1 and 2.

As described above, in the second embodiment, it is possible to flexibly select the protocol appropriate to access the storage device by providing the device protocol conversion unit in addition to the effects described in the first embodiment.

Third Embodiment

Figure 12:
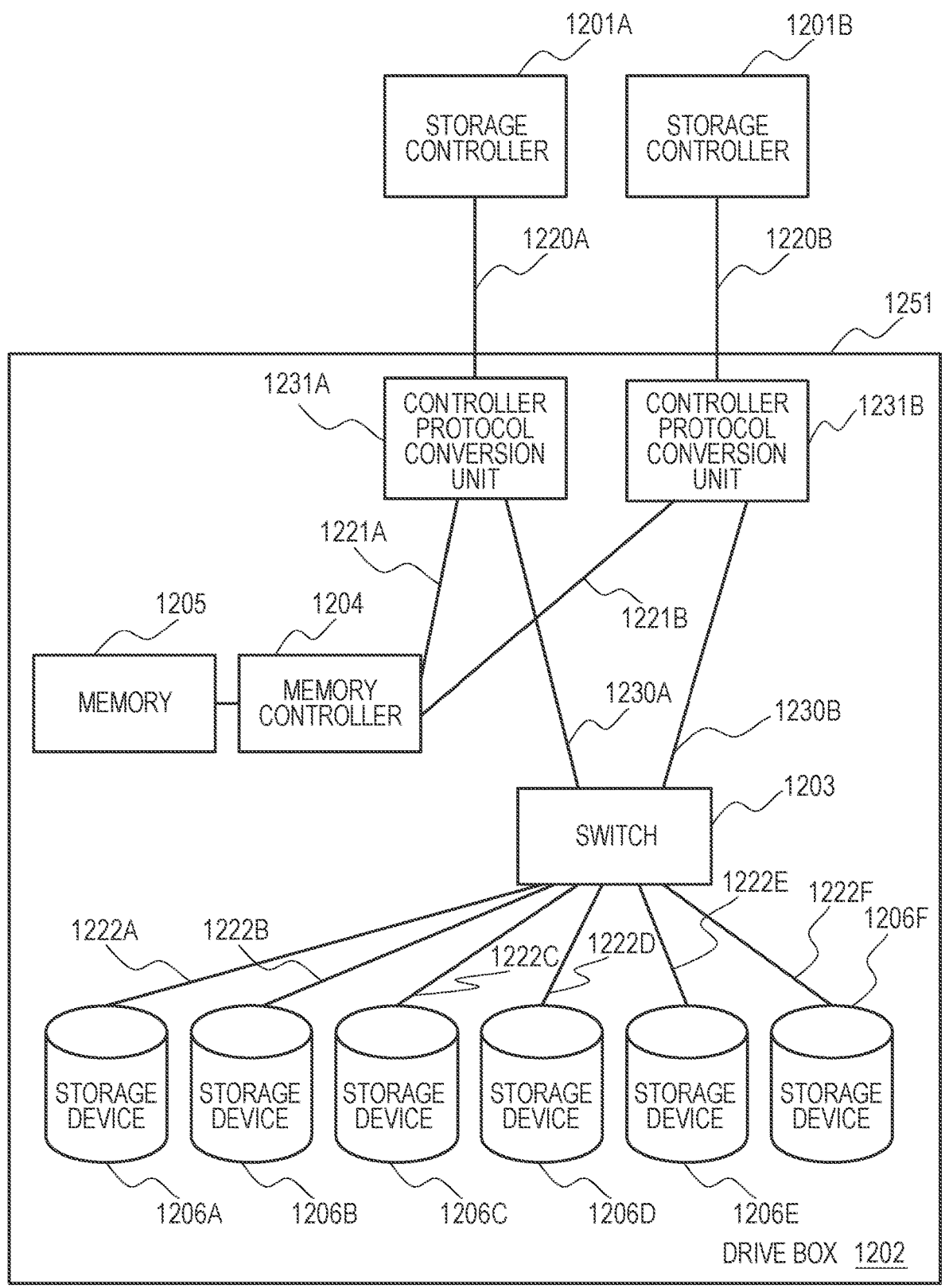
FIG. 12 is a seventh example of the configuration of the storage system according to the embodiment.

A third embodiment will be described with reference to FIG. 12. FIG. 12 illustrates a configuration example of a storage system according to the third embodiment. The configuration example of FIG. 12 includes controller protocol conversion units 1231A and 1231B between storage controllers 1201A and 1201B, a memory controller 1204, and a switch 1203.

The storage system according to the third embodiment includes the storage controllers 1201A and 1201B and a drive box 1202. The drive box 1202 includes the controller protocol conversion units 1231A and 1231B, the switch 1203, the memory controller 1204, a memory 1205, storage devices 1206A to 1206F, and a chassis 1251.

Although FIG. 12 illustrates two controller protocol conversion units as an example, the number of controller protocol conversion units is any number of one or more. Although the controller protocol conversion units 1231A and 1231B are described separately from the switch 1203 in the configuration example of FIG. 12, a controller protocol conversion and switch unit in which the controller conversion units and the switch are integrated into one may be provided instead.

Although FIG. 12 illustrates two storage controllers 1201A and 1201B, the number of storage controllers may be more than two. Although FIG. 12 illustrates one memory controller 1204 and one memory 1205 as an example, the number of these components may be any number of one or more. Although FIG. 12 illustrates six storage devices 1106A to 1106F as an example, the number of storage devices is not limited to six but one or more.

As described in the first and second embodiments, an access protocol for accessing the memory 1205 and an access protocol for accessing the storage devices 1206A to 1206F are required in the third embodiment.

In order to realize this requirement, in the third embodiment, an access protocol capable of being converted into both the access protocol for accessing the memory 1205 and the access protocol for accessing the storage devices 1206A to 1206F is used as the access protocol for passing through paths 1220A and 1220B from the storage controllers 1201A and 1202B.

When the storage controller 1201A or 1201B accesses the memory 1205, the controller protocol conversion unit 1231A or 1231B converts the access protocol from the storage controller 1201A or 1201B into the access protocol for accessing the memory 1205. The controller protocol conversion unit 1231A or 1231B sends the command (and the attached data) to the memory controller 1204 via path 1221A or 1221B.

When the storage controller 1201A or 1201B accesses the storage devices 1206A to 1206F, the controller protocol conversion unit 1231A or 1231B converts the access protocol from the storage controller 1201A or 1201B into the access protocol for accessing the storage devices 1206A to 1206F. The controller protocol conversion unit 1231A or 1231B sends the command (and the attached data) to the storage devices 1206A to 1206F via a path 1230A or 1230B, the switch 1203, and paths 1222A to 1222F.

The result of accessing the memory 1205 is returned from the memory controller 1204 to the controller protocol conversion unit 1231A or 1231B according to the access protocol for accessing the memory 1205. The controller protocol conversion unit 1231A or 1231B converts the access result into the access protocol used by the storage controllers 1201A and 1201B, and returns the result to the storage controller 1201A or 1201B.

The result of accessing the storage devices 1206A to 1206F is returned from the storage devices 1206A to 1206F to the controller protocol conversion unit 1231A or 1231B according to the access protocol for accessing the storage devices 1206A to 1206F. The controller protocol conversion unit 1231A or 1231B converts the access result into the access result using the access protocol used by the storage controllers 1201A and 1201B, and returns the result to the storage controller 1201A or 1201B.

An example of the access protocol used by the storage controllers 1201A and 1201B is, for example, Ethernet. When the memory 1205 is accessed by using Ethernet, the storage controllers 1201A and 1201B use, for example, RDMA over Converged Ether (RoCE) which is a high layer protocol on Ethernet.

When the storage devices 1206A to 1206F are accessed, the storage controllers 1201A and 1201B use, for example, NVMe over Fabrics which is a high layer protocol on Ethernet.

The controller protocol conversion units 1231A and 1231B convert the access command using the RoCE to the memory 1205 into, for example, the access command using the PCIe, and send the converted access command to the memory controller 1204. The controller protocol conversion units 1231A and 1231B convert the access using the NVMe over Fabrics to the storage devices 1206A to 1206F into, for example, the access using the NVMe, and access the storage devices 1206A to 1206F via the switch 1203.

An example of another protocol that can be used in the storage controllers 1201A and 1201B is the Transmission Control Protocol (TCP). When the memory 1205 is accessed, the controller protocol conversion units 1231A and 1231B convert the access command using the TCP into, for example, the access command using the PCIe, and sends the converted access command to the memory controller 1204.

When the storage devices 1206A to 1206F are accessed, the storage controllers 1201A and 1201B use, for example, internet Small Computer System Interface (iSCSI) which is a high layer protocol on TCP. The controller protocol conversion units 1231A and 1231B convert the access using the iSCSI performed by the storage controllers 1201A and 1021B into, for example, to the SAS.

The controller protocol conversion unit 1231A accesses any of the storage devices 1206A to 1206F by the SAS via any one of the access path 1230A, the switch 1203, and the access paths 1222A to 1206F. The controller protocol conversion unit 1231B accesses any of the storage devices 1206A to 1206F by the SAS via any one of the access path 1230B, the switch 1203, and the access paths 1222A to 1206F. Other operations are the same as those of the first embodiment described with reference to FIGS. 1 and 2.

As described above, in the third embodiment, it is possible to flexibly select the protocol in order to access the memory or the storage devices installed within the drive box from the storage controllers by providing the controller protocol conversion units in addition to the effects described in the first embodiment. In particular, it is possible to use the protocol capable of forming a network appropriate to access the drive box from the plurality of storage controllers, and for example, it is easy to add or replace the storage controller.

Fourth Embodiment

Figure 3:
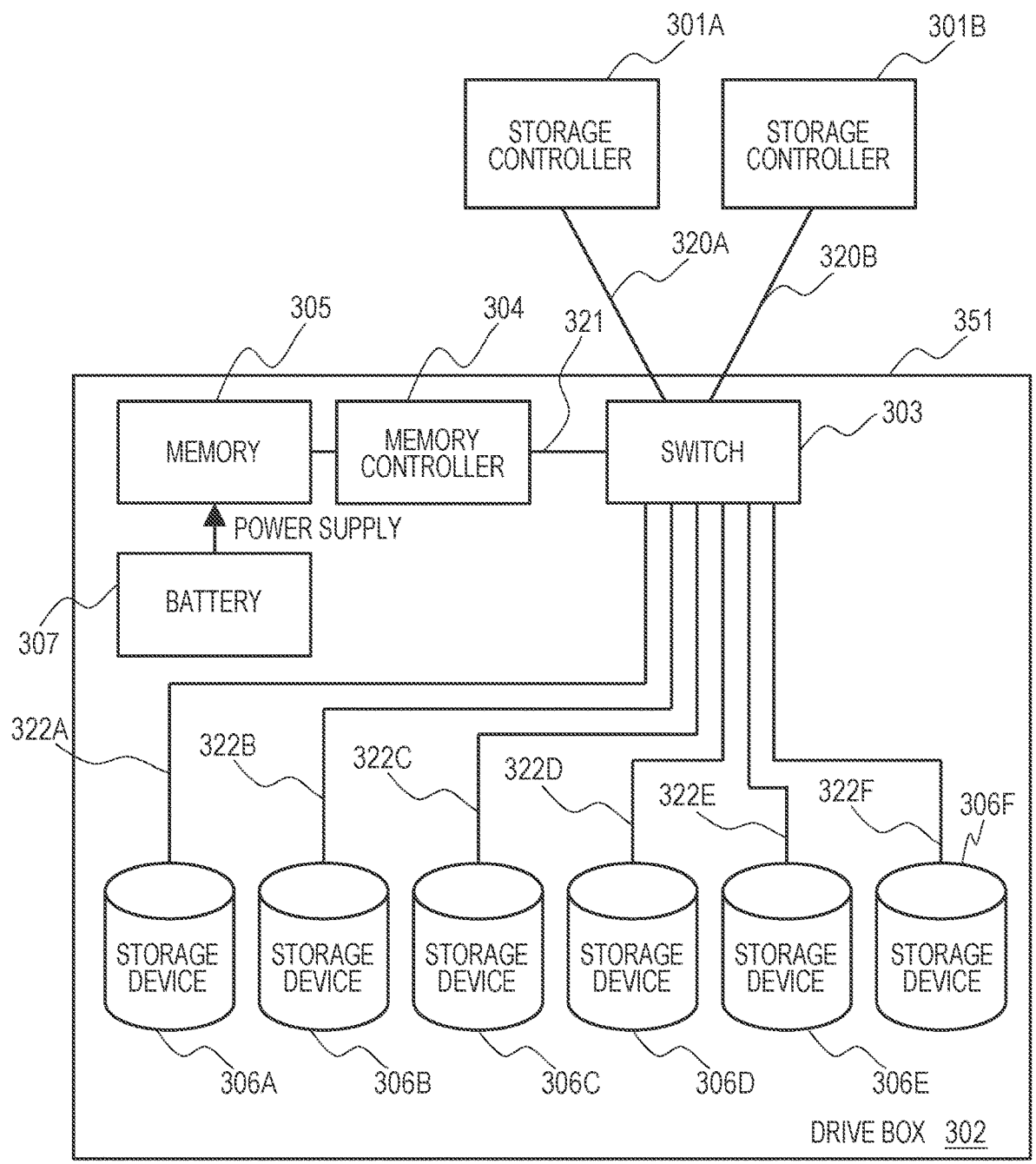
FIG. 3 is a second example of the configuration of the storage system according to the embodiment.

A fourth embodiment will be described with reference to FIG. 3. FIG. 3 illustrates a configuration example of a storage system according to the fourth embodiment. In the configuration example of FIG. 3, a drive box 302 includes a battery 307.

The storage system according to the fourth embodiment includes storage controllers 301A and 301B and the drive box 302. The drive box 302 includes a switch 303, a memory controller 304, a memory 305, storage devices 306A to 306F, the battery 307, and a chassis 351.

Although FIG. 3 illustrates two storage controllers 301A and 301B, the number of storage controllers may be more than two. Although FIG. 3 illustrates one memory controller 304 and one memory 305 as an example, the number of these components may be any number of one or more. Although FIG. 3 illustrates six storage devices 306A to 306F as an example, the number of storage devices is not limited to six but one or more.

In FIG. 3, when power feeding from the outside (not illustrated) is stopped for some reason, the battery 307 supplies a power to the memory 305 instead, and retains the contents of the memory 305. Accordingly, the storage system according to the fourth embodiment can retain the control information stored in the memory 305 even when the power feeding from the outside is stopped. As a result, when the power feeding from the outside is restored, the storage system can promptly resume the operation from the state when the external power feeding is stopped. A battery does not need to be installed in the storage controller. In general, since a battery provided in a drive box does not need to support the storage controller having large power consumption, the batter provided in the drive box can be smaller than the battery in the case installed on the storage controller.

When the memory 305 stores the write data before being stored in the storage devices 306A to 306F, it is possible to prevent the write data sent once to the drive box 302 by the storage controller 301A or 301B from being lost due to the outage of the external power feed. In FIG. 3, other operations are the same as those in the first embodiment described with reference to FIGS. 1 and 2.

Fifth Embodiment

Figure 4:
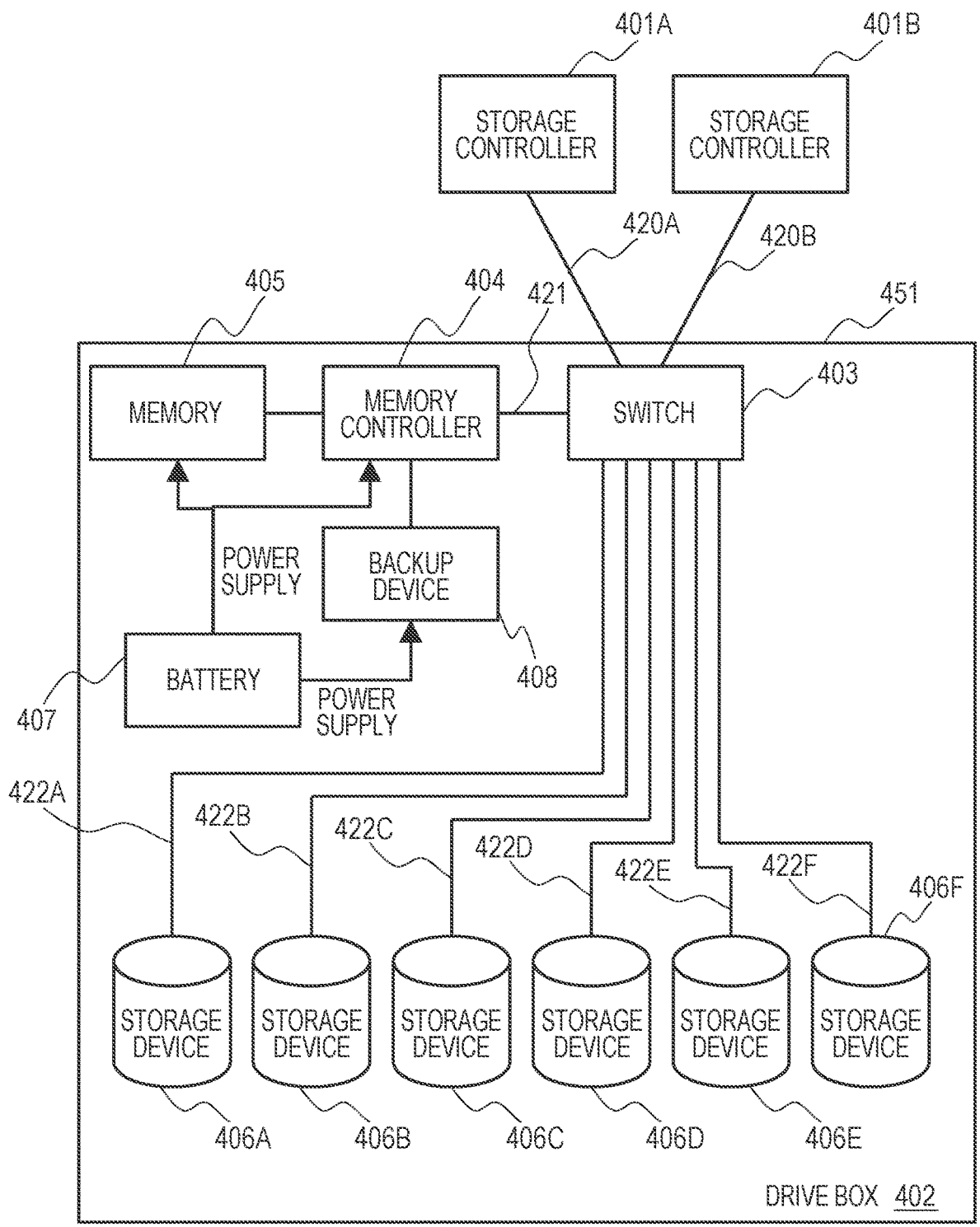
FIG. 4 is a third example of the configuration of the storage system according to the embodiment.

A fifth embodiment will be described with reference to FIGS. 4 and 5. FIG. 4 illustrates a configuration example of a storage system according to the fifth embodiment. In the configuration example of FIG. 4, a drive box 402 includes a battery 407 and a backup device (backup non-volatile storage device) 408.

The storage system according to the fifth embodiment includes storage controllers 401A and 401B and the drive box 402. The drive box 402 includes a switch 403, a memory controller 404, a memory 405, the storage devices 406A to 406F, the battery 407, the backup device 408, and a chassis 451.

Although FIG. 4 illustrates two storage controllers 401A and 401B, the number of storage controllers may be more than two. Although FIG. 4 illustrates one memory controller 404 and one memory 405 as an example, the number of these components may be any number of one or more. Although FIG. 4 illustrates six storage devices 406A to 406F as an example, the number of storage devices is not limited to six but one or more.

In FIG. 4, when power feeding from the outside (not illustrated) is stopped for some reason, the battery 407 supplies a power to the memory 405, the memory controller 404, and the backup device 408 instead. When the power feeding from the outside is stopped for some reason, the backup device 408 is used for backing up the contents of the memory 405. The backup device 408 is a non-volatile storage device, and is, for example, an SSD using a non-volatile semiconductor memory element.

In the storage system illustrated in FIG. 4, the backup device 408 is a device different from the storage devices 406A to 406F. In another example, all or a part of storage regions of one or more of the storage devices 406A to 406F may be used instead of the backup device 408.

Figure 5:
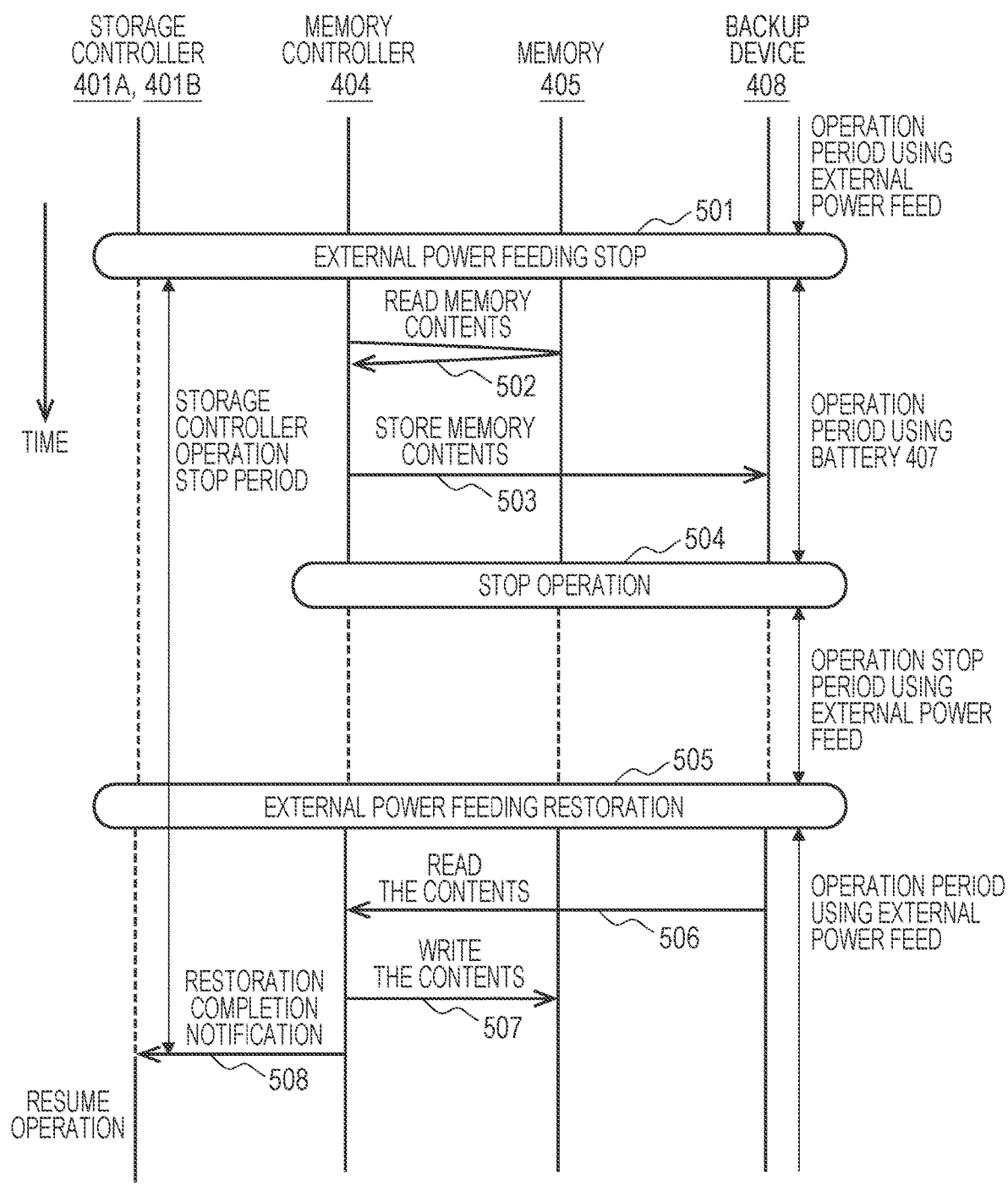
FIG. 5 is an example of an internal operation of the storage system according to the embodiment from when external power supply is shut down to when the external power supply is restored.

FIG. 5 illustrates a flow of processes of the storage system illustrated in FIG. 4 from the stop of the external power feed to the restoration of the external power feed. In FIG. 5, when the external power supply stops at a point of time 501, the storage controllers 401A and 401B stop the operation. Subsequently, in process 502, the memory controller 404 reads all necessary contents within the memory from the memory 405. Subsequently, in process 503, the memory controller 404 writes all the contents read from the memory 405 to the backup device 408. Thereafter, in process 504, the memory controller 404, the memory 405, and the backup device 408 stop the operations.

When the external power feeding is restored at a point of time 505, the storage controllers 401A and 401B temporarily enter a pause mode, and wait for a restoration completion notification without resuming the operation. During this pause mode, the memory controller 404 reads the contents from the backup device 408 in process 506. The memory controller 404 re-stores the contents read from the backup device 408 in the memory 405 to restore the contents in step 507. Finally, when all the contents in the backup device 408 are restored in the memory 405, the memory controller 404 sends the restoration completion notification to the storage controllers 401A and 401B in process 508. The storage controllers 401A and 401B resume the operations by using the information re-stored in the memory 405. Other operations are the same as those of the first embodiment described with reference to FIGS. 1 and 2.

Sixth Embodiment

Figure 6:
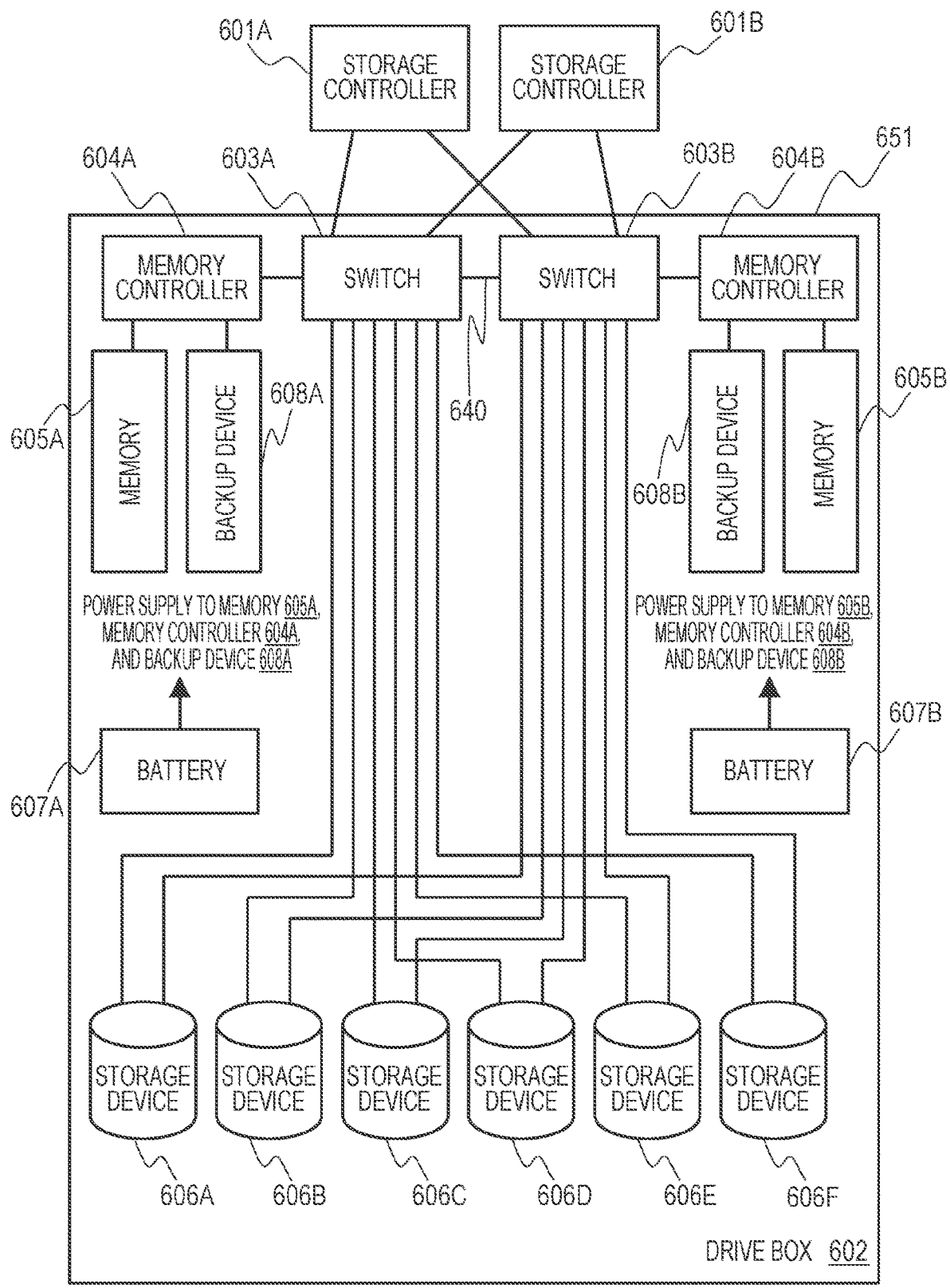
FIG. 6 is a fourth example of the configuration of the storage system according to the embodiment.
Figure 7:
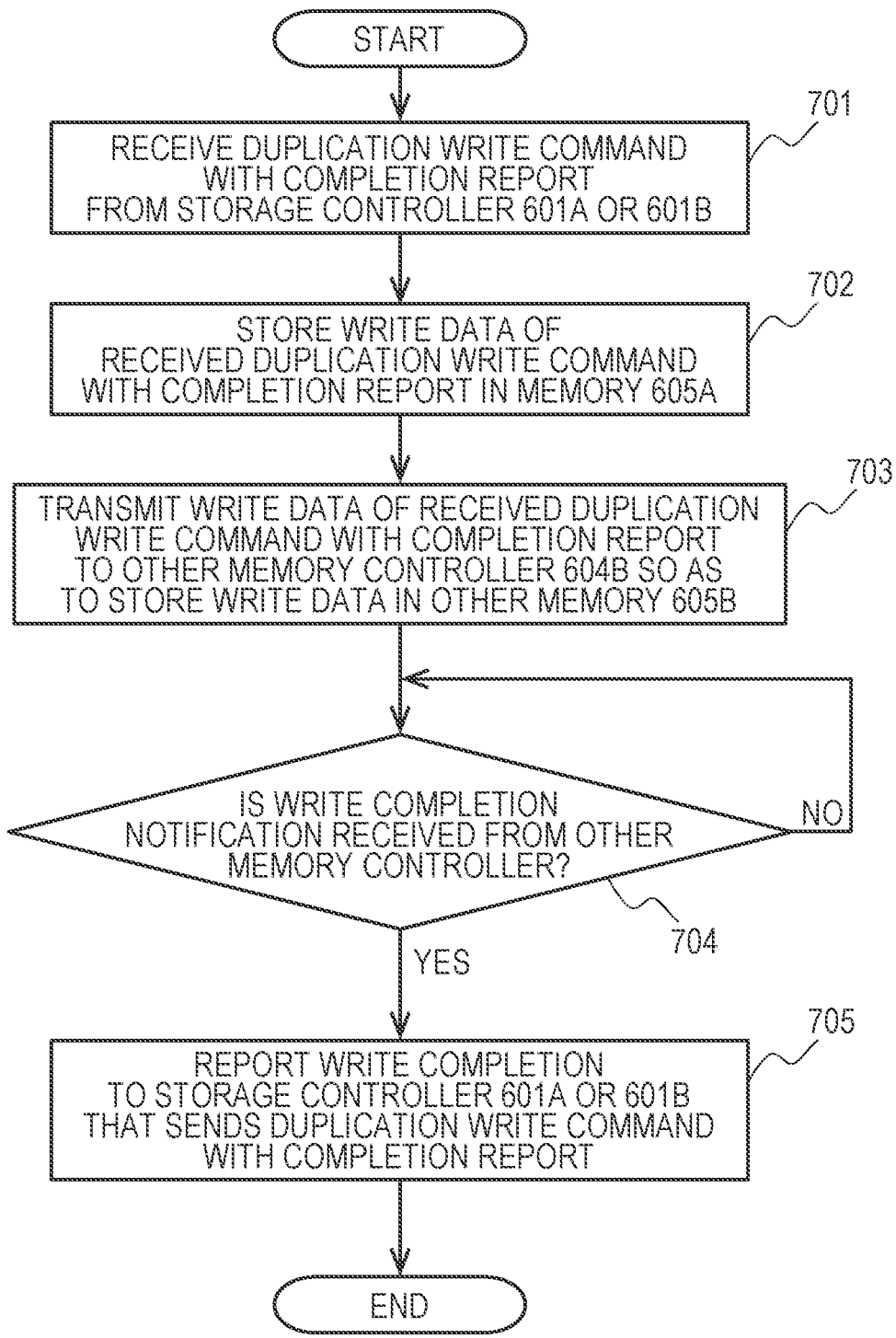
FIG. 7 is a flowchart illustrating an operation when a memory controller within the drive box of the storage system according to the embodiment receives a duplicate write command from the storage controller.

A sixth embodiment will be described with reference to FIGS. 6, 7, and 8. FIG. 6 illustrates a configuration example of a storage system according to the sixth embodiment. The storage system illustrated in FIG. 6 includes two storage controllers 601A and 601B and a drive box 602. The drive box 602 includes two switches 603A and 603B, two memory controllers 604A and 604B connected to the two switches 603A and 603B, two memories 605A and 605B, two backup devices 608A and 608B, two batteries 607A and 607B, and six storage devices 606A to 606F.

The number of storage controllers is any number of two or more. The number of memory controllers and the number of memories may be any number of two or more, and at least one memory controller and at least one memory are connected to each switch. The same applies to the backup device and the battery. The number of storage devices is any number of one or more. In the sixth embodiment, the storage devices 606A to 606F are dual-port storage devices each having two connection interface (ports). Each of two ports of the storage devices 606A to 606F is connected to the switches 603A and 603B, respectively.

In the sixth embodiment, the operation when the external power feeding is stopped and when the external power feeding is restored is the same as the operation of the fifth embodiment described with reference to FIGS. 4 and 5. However, in the storage system according to the sixth embodiment, the backup and restoration of the contents of the memory 605A are performed by the memory controller 604A, the backup device 608A, and the battery 607A, and the backup and restoration of the contents of the memory 605B are performed by the memory controller 604B, the backup device 608B, and the battery 607B.

The operations for the read command, the write command, and the exclusive access command of the memory controllers 604A and 604B for the memories 605A and 605B are the same as the operations of the first embodiment described with reference to FIGS. 1 and 2. However, the memory controller 604A controls the memory 605A, and the memory controller 604B controls the memory 605B.

In the configuration example illustrated in FIG. 6, an inter-switch path 640 is provided between the two switches 603A and 603B. One of the two memory controllers 604A and 604B can send a request to the other memory controller via the switch 603A, the inter-switch path 640, and the switch 603B, and can read and write from and to the other memory.

In the storage system, reliability is an important index. In order to improve the reliability, for example, the storage controllers 601A and 601B perform duplication by storing the processing data and the control information not only in one memory but also in another memory. In the sixth embodiment, one of the two memory controllers 604A and 604B can read and write for the other memory via the switches 603A and 603B and the inter-switch path 640.

Accordingly, the data and the control information can be efficiently duplicated within the drive box 602 in order to achieve the reliability.

In the sixth embodiment, the memory controllers 604A and 604B can receive a duplication write command in order to efficiently duplicate the processing data and the control information. In order to further improve the reliability, the memory controllers 604A and 604B can receive, among the duplication write commands, a duplication write command with a completion report for reporting and ensuring that the entire write operation is completed.

Hereinafter, the memory controller 604A will be described, but the same description can apply to the memory controller 604B. FIG. 7 is a flowchart illustrating processes when the memory controller 604A receives the duplication write command with the completion report from the storage controller 601A or 601B.

In step 701, the memory controller 604A receives the duplication write command with the completion report from the storage controller 601A or 601B. In step 702, the memory controller 604A stores the write data of the received duplication write command with the completion report in the memory 605A.

In step 703, the memory controller 604A transmits the write data of the received duplication write command with the completion report to the other memory controller 604B so as to store the write data in the other memory 605B. In the configuration example illustrated in FIG. 6, the write data reaches the other memory controller 604B via the switch 603A, the inter-switch path 640, and the switch 603B. The other memory controller 604B stores the received write data in the memory 605B, and sends a write completion notification to the memory controller 604A when the write operation is completed.

In step 704, the memory controller 604A waits for the write completion notification from the other memory controller 604B, and proceeds to next step 705 when the write completion notification is received.

In step 705, the memory controller 604A reports the write completion of the write data to the storage controller 601A or 601B that sends the duplication write command with the completion report. This write completion report may be sent, for example, by using a special signal line such as an interrupt, or may be sent by returning a part or all of the write data.

Figure 8:
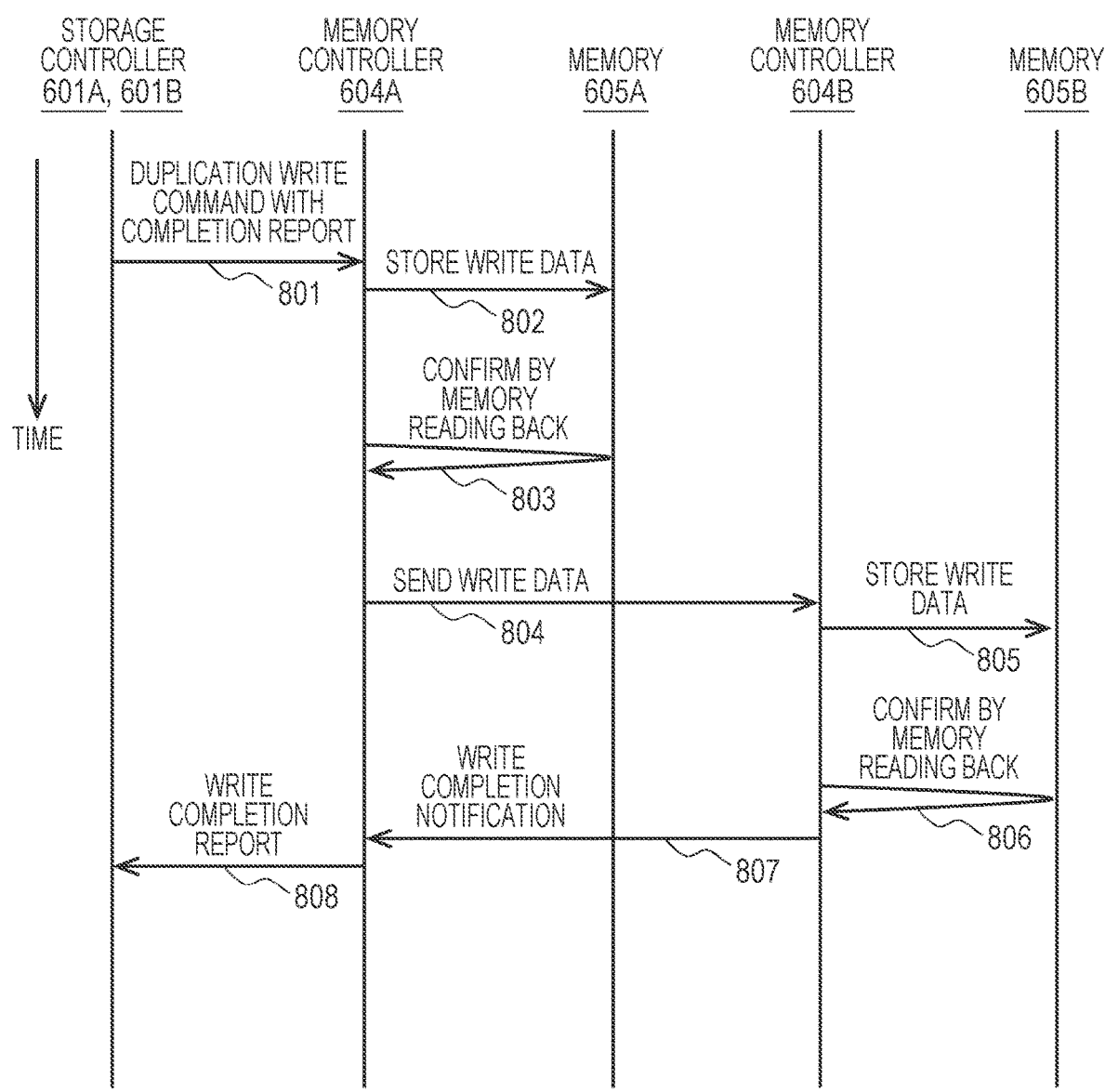
FIG. 8 is an example of an operation for duplicating two memories within the drive box by the duplicate write command in the storage system according to the embodiment.

FIG. 8 illustrates a sequence diagram of a processing flow of the duplication write command with the completion report. In FIG. 8, the storage controller 601A or 601B sends the duplication write command with the completion report to the memory controller 604A in process 801.

In process 802, the memory controller 604A stores the write data of the duplication write command with the completion report in the memory 605A. Subsequently, in process 803, the memory controller 604A reads back the memory 605A, and confirms that the write data is actually stored in the memory 605A. When a need for reliability is not so high, process 803 may not be performed.

Subsequently, in process 804, the memory controller 604A sends the write data to the memory controller 604B. The memory controller 604B that receives the write data writes the received write data to the memory 605 in process 805. Subsequently, in process 806, the memory controller 604B reads back the memory 605B, and confirms that the write data is actually stored in the memory 605B. When a need for reliability is not so high, process 806 may not be performed.

Subsequently, after it is confirmed in process 806 that the write data is actually stored in the memory 605B, the memory controller 604B returns a write completion notification to the memory controller 604A in process 807. When the write completion notification is received from the memory controller 604B, the memory controller 604A sends a write completion report to the storage controller 601A or 601B in process 808.

With the aforementioned operation, in the storage system according to the sixth embodiment, the process of duplicating the processing data and the control information for improving the reliability can be efficiently performed in the drive box 602. In particular, the reliability can be further improved by using the duplication write command with the completion report for ensuring the completion of the write operation.

Seventh Embodiment

Figure 9:
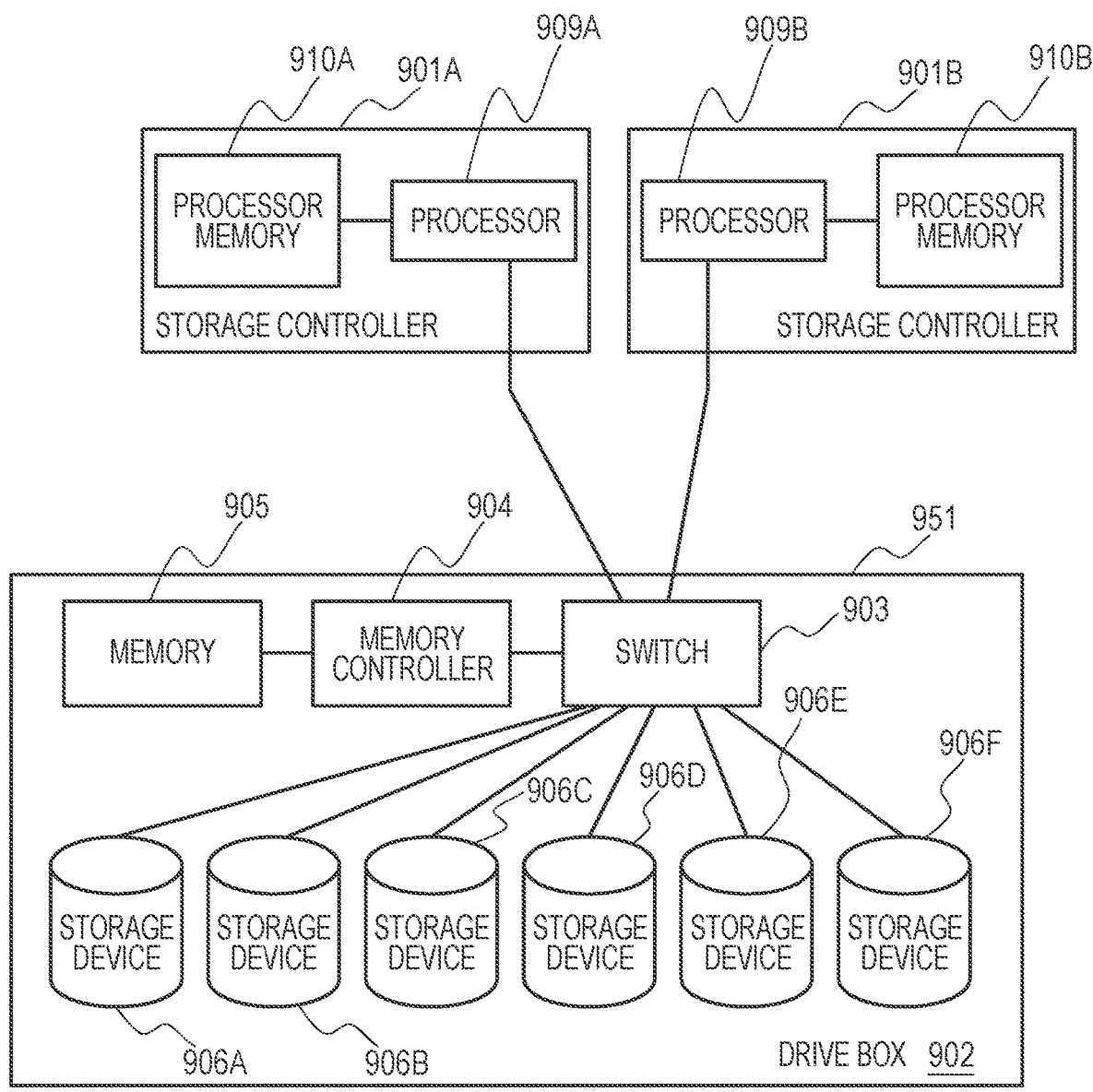
FIG. 9 is a fifth example of the configuration of the storage system according to the embodiment.

A seventh embodiment will be described with reference to FIGS. 9 and 10. FIG. 9 illustrates a configuration example of a storage system according to the seventh embodiment. In the configuration example of FIG. 9, storage controllers 901A and 901B include processors 909A and 909B and processor memories 910A and 910B, respectively.

The storage system according to the seventh embodiment further includes a drive box 902. The drive box 902 includes a switch 903, a memory controller 904, a memory 905, storage devices 906A to 906F, and a chassis 951. Although FIG. 9 illustrates two storage controllers 901A and 901B, the number of storage controllers may be more than two. Although FIG. 9 illustrates one memory controller 904 and one memory 905 as an example, the number of these components may be any number of one or more. Although FIG. 9 illustrates six storage devices 306A to 306F as an example, the number of storage devices is not limited to six but one or more. The operations of the read command, the write command, and the exclusive access command of the memory controller 904 for the memory 905 are the same as the operations of the first embodiment described with reference to FIGS. 1 and 2.

In FIG. 9, the processors 909A and 909B of the storage controllers 901A and 901B read and write the programs, the processing data, and the control information stored in the processor memories 910A and 910B, respectively, and control the storage system. The processors 909A and 909B read and write the processing data and the control information from and to the memory 905 through the memory controller 904 within the drive box 902. In order to control the storage system in cooperation with the other processor, one of the processors 909A and 909B update the control information by storing the control information in the memory 905 within the drive box 902 and using the exclusive access command through the memory controller 904 for arbitration of updating the control information between the processors 909A and 909B.

In FIG. 9, when the other processor updates the processing data or the control information in the memory 905, one of the processors 909A and 909B can further set the memory controller 904 to send the updated data. By doing so, it is possible to duplicate the processing data and the control information between the processor memory 910A or 910B and the memory 905 within the drive box 902 while maintaining consistency, and thus, it is possible to improve the reliability of the storage system.

Although the storage controller 901A, the processor 909A, and the processor memory 910A will be described in the following description, the same applies to the storage controller 901B, the processor 909B, and the processor memory 910B.

Figure 10:
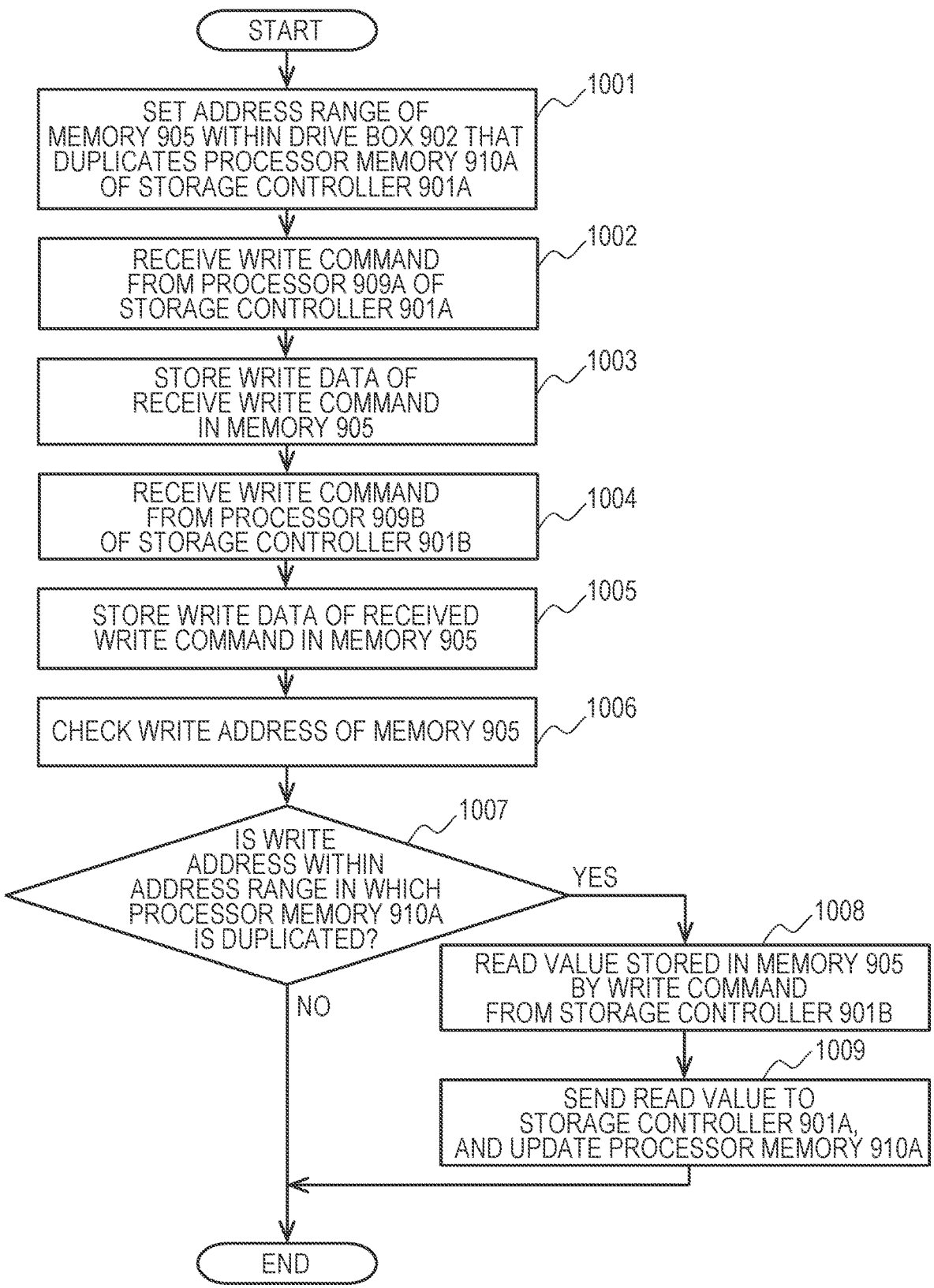
FIG. 10 is a flowchart of an operation of the memory controller in another example in which duplication is performed in the storage system according to the embodiment.

FIG. 10 is an example of a flowchart of processes of the memory controller 904 when the data or the control information is duplicated in the processor memory 910A and the memory 905 within the drive box 902.

In FIG. 10, in step 1001, the processor 909A within the storage controller 901A sets an address range of the memory 905 to the memory controller 904 within the drive box 902 for duplicating the processor memory 910A. The setting may include using a special signal line, or may include sending a specific value from the processor 909A to the memory controller 904. Or, the setting may include a situation where a dedicated register may be prepared within the memory controller 904, and some operation of the processor 909A to write a specific value to the dedicated register.

Subsequently, in step 1002, the memory controller 904 receives the write command from the processor 909A of the storage controller 901A. In step 1003, the memory controller 904 stores the write data of the received write command in the memory 905.

Subsequently, in step 1004, the memory controller 904 receives the write command from the processor 909B of the storage controller 901B, which is different from the storage controller 901A. This write command may be a normal write command, or may be an exclusive access command such as the exclusive exchange command described in the first embodiment.

In step 1005, the memory controller 904 stores the write data of the write command received in the memory 905. Subsequently, in step 1006, the memory controller 904 checks a write address for the memory 905 of the write command sent from the processor 909B of the storage controller 901B.

In step 1007, the memory controller 904 determines whether or not the write address is within the address range of the memory 905 for duplicating the processor memory 910A set in step 1001. When the write address is not within the address range as the result of the determination, the memory controller 904 ends the processing. When the write address is within the address range as the result of the determination, the memory controller 904 proceeds to step 1008.

In step 1008, the memory controller 904 reads the data written in the memory 905 by the write command of the processor 909B of the storage controller 901B. Subsequently, in step 1009, the memory controller 904 sends the read data to the storage controller 901A, and updates the contents of the processor memory 910A. This update may be performed by receiving the updated information and storing the updated information in the processor memory 910A by software running on the processor 909A within the storage controller 901A, or automatically receiving the updated information and storing the updated information in the processor memory 910A by the hardware of the processor 909A.

As described above, the data and the control information can be duplicated between the processor memory 910A and the memory 905 within the drive box 902 while maintaining consistency, and the reliability of the storage system can be improved.

The present invention is not limited to the aforementioned embodiments, and includes various modification examples. For example, the aforementioned embodiments are described in detail in order to facilitate easy understanding of the present invention, and are not limited to necessarily include all the described components. Some of the components of a certain embodiment can be substituted into the components of another embodiment, and the components of another embodiment can be added to the component of a certain embodiment. Additions, the components of another embodiment can be added, removed, and substituted to, from, and into some of the components of the aforementioned embodiments.

In addition, a part or all of the aforementioned configurations, functions, and processing units may be realized by hardware by designing an integrated circuit, for example. Or, each of the aforementioned configurations and functions may be realized by software by interpreting and executing a program that realizes each function by the processor. Information of programs, tables, and files for realizing the functions can be stored in a recording device such as a memory, a hard disk, or a solid state drive (SSD), or a recording medium such as an IC card, or an SD card.

Furthermore, control lines and information lines illustrate lines which are considered to be necessary for the description, and not all the control lines and information lines in a product are necessarily illustrated. Almost all the configurations may be considered to be actually connected to each other.

What is claimed is:

1. A storage system comprising:
a plurality of storage controllers; and
a drive box that includes one or more non-volatile storage devices, wherein the drive box includes:
a memory on which reading and writing are performed in a unit different from a unit for reading and writing from/to the one or more non-volatile storage devices, and which stores control information to be used by the plurality of storage controllers; and
a memory controller that enables each storage controller of the plurality of storage controllers to exclusively read and write the control information of the memory by mediating access to the memory from each of the plurality of storage controllers,
the storage system further comprising:
a plurality of memories including the memory; and
a plurality of memory controllers including the memory controller, wherein
each memory of the plurality of memories is connected to only one memory controller of the plurality of memory controllers,
a first memory controller of the memory controllers transmits the information stored in the memory connected to the first memory controller to one or more other memory controllers, and
each of the one or more other memory controllers stores the information received from the first memory controller in the memory connected to each of the one or more other memory controllers.

2. The storage system according to claim 1, wherein
the drive box includes a battery that supplies a power when external power feeding is stopped, and
the memory retains contents of the memory by the power from the battery when the external power feeding is stopped.

3. The storage system according to claim 2, wherein
the plurality of storage controllers stops operations when the external power feeding is stopped, and resumes the operations by using the control information stored in the memory when the external power feeding is restored.

4. The storage system according to claim 1, wherein the memory controller writes contents of the memory to the one or more non-volatile storage devices or another backup storage device within the drive box when external power feeding is stopped.

5. The storage system according to claim 1, wherein the memory includes a non-volatile memory element.

6. The storage system according to claim 1, wherein
the first memory controller stores the information received from one storage controller of the plurality of storage controllers in the memory connected to the first memory controller according to an instruction from the one storage controller, and transmits the information received from the one storage controller to the one or more other memory controllers,
each of the one or more other memory controllers transmits a write completion notification indicating that the writing of the information received from the first memory controller into the memory connected to each of the one or more other memory controllers is completed to the first memory controller, and
the first memory controller notifies the one storage controller of a write completion of the information received from the one storage controller when the write completion notification is received from all the one or more other memory controllers.

7. The storage system according to claim 1, wherein
the drive box includes a device protocol conversion unit, and
each of the plurality of storage controllers transmits a command for the memory and a command for the one or more non-volatile storage devices according to an access protocol for accessing the memory, and
the device protocol conversion unit converts the command for the one or more non-volatile storage devices into a command of an access protocol for accessing the one or more non-volatile storage devices.

8. The storage system according to claim 1, wherein the drive box includes a controller protocol conversion unit,
each of the plurality of storage controllers transmits a command for the memory and a command for the one or more non-volatile storage devices according to an access protocol capable of being converted into both an access protocol for accessing the memory and an access protocol for accessing the one or more non-volatile storage devices, and
the controller protocol conversion unit converts the command for the memory into a command of the access protocol for accessing the memory, and converts the command for the one or more non-volatile storage devices into a command of the access protocol for accessing the one or more non-volatile storage devices.

9. A control method of a storage system, wherein the storage system includes
a plurality of storage controllers, and
a drive box that includes one or more non-volatile storage devices, and a memory on which reading and writing are performed in a unit different from a unit for reading and writing from/to the one or more non-volatile storage devices and which stores control information to be used by the plurality of storage controllers, and
the control method comprising the steps of:
receiving an exclusive access command for the control information of the memory from one storage controller of the plurality of storage controllers;
letting another access command received from storage controller different from the one storage controller wait until the exclusive access command is completed;
executing the other access command after the exclusive access command is completed;
writing contents of the memory to the one or more non-volatile storage devices or another backup non-volatile storage device within the drive box when external power feeding is stopped;
waiting, by the plurality of storage controllers, for a restoration completion notification from the drive box when the external power feeding is restored after the external power feeding is stopped;
re-storing, by the drive box, the contents of the memory written in the one or more non-volatile storage devices or another backup non-volatile storage device into the memory;
transmitting, by the drive box, the restoration completion notification indicating that the contents of the memory are re-stored in the memory to each of the plurality of storage controllers; and
resuming, by each of the plurality of storage controllers, an operation when the restoration completion notification is received.

10. The control method according to claim 9, wherein the drive box includes a memory controller,
each of the plurality of storage controllers includes a processor that performs control and a processor memory connected to the processor,
the control method further includes
transmitting, by the processor of the one storage controller of the plurality of storage controllers, information stored in the processor memory of the one storage controller to the memory controller,
storing, by the memory controller, the transmitted information in the memory of the drive box,
transmitting, by the memory controller, updated information to the processor of the one storage controller when the information stored in the memory is updated by another processor different from the processor of the one storage controller, and
reflecting, by the processor of the one storage controller, the updated information to the information stored in the processor memory of the one storage controller.

11. A control method of a storage system, wherein
the storage system includes
a plurality of storage controllers, and
a drive box that includes one or more non-volatile storage devices, and a memory on which reading and writing are performed in a unit different from a unit for reading and writing from/to the one or more non-volatile storage devices and which stores control information to be used by the plurality of storage controllers, and
the control method comprising the steps of:
receiving an exclusive access command for the control information of the memory from one storage controller of the plurality of storage controllers;
letting another access command received from a storage controller different from the one storage controller wait until the exclusive access command is completed;
executing the other access command after the exclusive access command is completed, wherein
the drive box includes a plurality of memories including the memory, and
the control method further comprises:
writing information stored in one of the plurality of memories into the other one or more memories.

12. The control method according to claim 11, further comprising:
 writing the information stored in one memory of the plurality of memories by the one storage controller of the plurality of storage controllers into the other one or more memories different from the one memory; and
 notifying the one storage controller that writing of the information is completed after writing of the information into the other one or more memories is completed.

* * * * *